United States Patent [19]
Miyatake et al.

[11] Patent Number: 5,804,655
[45] Date of Patent: Sep. 8, 1998

[54] SILICONE-MODIFIED ACRYLIC RUBBER PARTICLES, GRAFT COPOLYMER PARTICLES OF SILICONE-MODIFIED ACRYLIC RUBBER AND THERMOPLASTIC RESIN COMPOSITION

[75] Inventors: Nobuo Miyatake, Takasago; Hiroki Yoshino; Hideki Hosoi, both of Kobe, all of Japan

[73] Assignee: Kaneka Corporation, Osaka, Japan

[21] Appl. No.: 836,324

[22] PCT Filed: Sep. 9, 1996

[86] PCT No.: PCT/JP96/02566

§ 371 Date: May 7, 1997

§ 102(e) Date: May 7, 1997

[87] PCT Pub. No.: WO97/10283

PCT Pub. Date: Mar. 20, 1997

[30] Foreign Application Priority Data

Sep. 12, 1995 [JP] Japan .................................. 7-234108
May 23, 1996 [JP] Japan .................................. 8-128713

[51] Int. Cl.$^6$ ........................ C08F 283/12; C08G 77/442
[52] U.S. Cl. ........................ 525/69; 525/100; 525/102; 525/105
[58] Field of Search .................... 525/100, 102, 525/105, 69

[56] References Cited

U.S. PATENT DOCUMENTS

| | | | |
|---|---|---|---|
| 4,859,740 | 8/1989 | Damrath | ................... 525/100 |
| 4,885,209 | 12/1989 | Lindner et al. . | |
| 4,994,522 | 2/1991 | Sasaki et al. . | |
| 4,994,523 | 2/1991 | Sasaki et al. . | |
| 5,132,359 | 7/1992 | Sasaki et al. . | |
| 5,171,786 | 12/1992 | Lindner et al. . | |
| 5,179,144 | 1/1993 | Yamamoto | ................ 524/114 |
| 5,268,403 | 12/1993 | Sasaki | ..................... 524/141 |

FOREIGN PATENT DOCUMENTS

| | | |
|---|---|---|
| 0 258 746 | 3/1988 | European Pat. Off. . |
| 0 260 552 | 3/1988 | European Pat. Off. . |
| 0 279 261 | 8/1988 | European Pat. Off. . |
| 0 296 403 | 12/1988 | European Pat. Off. . |
| 0 485 771 | 5/1992 | European Pat. Off. . |
| 0 488 263 | 6/1992 | European Pat. Off. . |
| 62-280210 | 12/1987 | Japan . |
| 63-202631 | 8/1988 | Japan . |
| 4-100812 | 4/1992 | Japan . |
| 4-198358 | 7/1992 | Japan . |
| 4-306252 | 10/1992 | Japan . |

OTHER PUBLICATIONS

Database WPI, Section Ch, Week 9250, Derwent Publications Ltd., London, GB AN 92–410440, XP002053807, JP 04 306 251 A (Mitsubishi Rayon Co Ltd), Oct. 29, 1992 Abstract.

*Primary Examiner*—Patricia A. Short
*Attorney, Agent, or Firm*—Armstrong, Westerman, Hattori, McLeland & Naughton

[57] ABSTRACT

To provide novel silicone-modified acrylic rubber particles prepared at a high conversion without using a special polymerization plant by graft-polymerizing (B) 45 to 5,000 parts by weight of a silicone rubber precursor comprising 99.9 to 80% by weight of a low molecular weight organosiloxane, 0.1 to 10% by weight of a polyfunctional silane compound and 0 to 10% by weight of a reactive silane compound having a polymerizable unsaturated bond or a mercapto group in its molecule to (A) 100 parts by weight of acrylic rubber particles, and if necessary, thereto by graft-polymerizing (C) 0.1 to 5,000 parts by weight of an acrylic rubber precursor; graft copolymer particles of silicone-modified acrylic rubber which are prepared from the above-mentioned acrylic rubber particles and are capable of improving weather resistance and impact resistance of various thermoplastic resins; and a thermoplastic resin composition comprising the above-mentioned resin and the graft copolymer particles.

17 Claims, No Drawings

SILICONE-MODIFIED ACRYLIC RUBBER PARTICLES, GRAFT COPOLYMER PARTICLES OF SILICONE-MODIFIED ACRYLIC RUBBER AND THERMOPLASTIC RESIN COMPOSITION

TECHNICAL FIELD

The present invention relates to silicone-modified acyrlic rubber particles, graft copolymer particles of silicon-modified acrylic rubber which are prepared by using the above-mentioned rubber particles and are excellent in impact resistance and weather resistance, and a thermoplastic resin composition which comprises the above-mentioned graft copolymer particles and a thermoplastic resin and is excellent in weather resistance and impact resistance.

BACKGROUND ART

Enhancement of impact resistance of a thermoplastic resin has been heretofore made widely by blending, to the resin, a modifier comprising graft copolymer particles containing a rubber particle component.

As the rubber particle component contained in the above-mentioned graft copolymer particles there are widely used, for example, polybutadiene rubber particles, styrene-butadiene copolymer rubber particles, acrylic rubber particles, and the like.

In order to enhance the above-mentioned impact resistance, for example, a modifier prepared by graft-copolymerizing methyl methacrylate and styrene to the above-mentioned styrene-butadiene copolymer rubber particles (so-called MBS resin), or a modifier prepared by graft-polymerizing methyl methacrylate to the above-mentioned acrylic rubber particles is commercially available as an impact modifier used for vinyl chloride resin (which include vinyl chloride homopolymer resin and a vinyl chloride copolymer resin obtained by copolymerizing vinyl chloride with not more than 50% (% by weight, hereinafter the same) of a monomer copolymerizable therewith, for example, vinyl acetate, ethylene, acrylic acid ester, vinyl bromide or two or more thereof, and further include a chlorinated polyvinyl chloride (chlorine content: 60 to 68%).

Also there is known so-called rubber reinforced resin obtained by blending, to the thermoplastic resin, graft copolymer particles as the impact modifier, which are prepared by graft-polymerizing, to the above-mentioned rubber particles, a vinyl monomer (which includes not only a vinyl monomer but also a monomer having polymerizable C=C bond, such as vinylidene monomer). As the graft copolymer particles, there are well known, for example, an impact resistance polystyrene (HIPS) prepared by graft-polymerizing styrene to polybutadiene rubber particles, an acrylonitrile/butadiene/styrene copolymer (ABS) prepared by graft-copolymerizing acrylonitrile and styrene to polybutadiene rubber particles.

The above-mentioned impact modifier obtained by using the polybutadiene rubber particles exhibits a large effect of improvement of impact resistance because its glass transition temperature (Tg) is as low as around −80° C., but has a problem such that since polybutadiene has unsaturated bonds in its structure, deterioration due to oxidation is easy to occur and weather resistance is worse.

On the contrary, the impact modifier obtained by using the acrylic rubber particles has a good weather resistance, but has a drawback such that impact resistance, particularly one at a low temperature is not sufficient since the Tg is relatively high, i.e. around −50° C.

In order to overcome these drawbacks, it was proposed to use graft copolymer particles of silicone rubber particles or of a composite rubber ontaining silicone rubber particles.

In case where the above-mentioned silicone rubber particles are used, weather resistance is excellent, and in addition, it can be expected that weather resistance and impact resistance are improved since the Tg is −120° C. which is lower than that in case of the above-mentioned polybutadiene rubber particles.

For example, JP-A-100812/1992 discloses the use of composite rubber (graft copolymer) particles having such a structure that a polyorganosiloxane rubber component and a polyalkyl (meth)acrylate rubber component are entangled with each other so as not to be separated. Those composite rubber particles are prepared by emulsifying and dispersing a cyclic siloxane in an aqueous medium by using alkylbenzenesulfonic acid with a high pressure homogenizer or the like, polymerizing as it is to prepare an emulsion containing polyorganosiloxane particles, impregnating these particles with butyl acrylate or the like and then radical-polymerizing. In case of preparing the composite rubber particles described in JP-A-100812/1992, there is a problem such that they cannot be produced through emulsion polymerization method employing a conventional emulsion polymerization plant, and a special apparatus such as a high pressure homogenizer for setting the initial particle size is necessary, which compels manufactures having only a conventional emulsion polymerization plant to make new investment.

Also JP-A-6012/1989 describes composite rubber particles comprising a core of acrylic rubber particle and a shell of polyorganosiloxane rubber. Those composite rubber particles are ones having the core/shell structure and obtained by adding siloxane in the presence of an emulsion containing acrylic rubber particles and then polymerizing. However, in case where the composite rubber particles described in the above-mentioned JP-A-6012/1989 are produced, though a conventional emulsion polymerization plant can be used as it is, there is a problem with impact resistance because there exists no chemical bond between the core of acrylic rubber particle and the shell of polyorganosiloxane (namely, not graft-polymerization and the produced particles are unsatisfactory as the composite rubber particles. Furthermore, in that method, in case where there are produced composite rubber particles containing not less than 70% by weight of acrylic rubber particles on the basis of the sum of the acrylic rubber particles and polyorganosiloxane, there is a problem such that a conversion of organosiloxane decreases and an amount of remaining low molecular weight organosiloxane increases.

In view of the above-mentioned problems, the present inventors have made intensive studies and as a result, have found the fact that novel composite rubber particles (namely, silicone-modified acrylic rubber particles), in which a precursor of silicone rubber is grafted to acrylic rubber particles, can be produced without using a special apparatus by, in a first step, when preparing an acrylic rubber, copolymerizing a monomer having polymerizable unsaturated bond and reactive silyl group in its molecule and, in a second step, graft-polymerizing a precursor of silicone rubber thereto, and the fact that the use of graft copolymer particles of silicone-modified acrylic rubber which are prepared from the silicone-modified acrylic rubber particles is very effective for obtaining good weather resistance and improving impact resistance.

Further the present inventors have found the fact that when preparing silicone-modified acrylic rubber particles having a low content of a silicone rubber, composite rubber particles in which the silicone rubber precursor is grafted to the acrylic rubber particles, can be obtained at a high conversion without using a special apparatus, by graft-polymerizing the silicone rubber precursor to the acrylic rubber particles in an amount of not lowering the conversion and further graft-polymerizing the acrylic rubber precursor thereto, and the fact that the use of the graft copolymer particles of silicone-modified acrylic rubber prepared from the silicone-modified acrylic rubber particles is very effective for obtaining good weather resistance and improving impact resistance.

Namely, an object of the present invention is to provide novel silicone-modified acrylic rubber particles obtainable at a high conversion without using a special apparatus; graft copolymer particles of silicone-modified acrylic rubber which can be obtained from the above-mentioned silicone-modified acrylic rubber particles and can improve weather resistance and impact resistance of various thermoplastic resins; and a thermoplastic resin composition comprising the above-mentioned resin and graft copolymer particles.

DISCLOSURE OF THE INVENTION

The present invention relates to the silicone-modified acrylic rubber particles (hereinafter referred to as "silicone-modified acrylic rubber particles (D1)") prepared by graft-polymerizing; (B) 45 to 5,000 parts by weight of a silicone rubber precursor comprising (B-1) 99.9 to 80% by weight of a low molecular weight organosiloxane, (B-2) 0.1 to 10% by weight of a polyfunctional silane compound and (B-3) 0 to 10% by weight of reactive silane compound having a polymerizable unsaturated bond or a mercapto group in its molecule (the sum of (B-1) to (B-3) being 100% by weight) to (A) 100 parts by weight of acrylic rubber particles obtained by copolymerizing (A-1) 99.9 to 65% by weight of at least one monomer selected from the group consisting of an alkyl acrylate having an alkyl group of 1 to 12 carbon atoms and an alkyl methacrylate having an alkyl group of 4 to 12 carbon atoms, (A-2) 0 to 5% by weight of a polyfunctional monomer having two or more of polymerizable unsaturated bonds in its molecule, (A-3) 0.1 to 10% by weight of a monomer having a polymerizable unsaturated bond and a reactive silyl group in its molecule and (A-4) 0 to 20% by weight of a monomer having an unsaturated bond copolymerizable with the monomers (A-1) to (A-3) (the sum of (A-1) to (A-4) being 100% by weight), (provided that the monomer (A-2) and (B-3) being not zero at the same time).

Further the present invention relates to the silicone-modified acrylic rubber particles (hereinafter referred to as "silicone-modified acrylic rubber particles (D2)") prepared by graft polymerizing; (B) 45 to 5,000 parts by weight of a silicone rubber precursor comprising (B-1) 99.9 to 80% by weight of a low molecular weight organosiloxane, (B-2) 0.1 to 10% by weight of a polyfunctional silane compound and (B-3) 0 to 10% by weight of a reactive silane compound having a polymerizable unsaturated bond or a mercapto group in its molecule (the sum of (B-1) to (B-3) being 100% by weight) to (A) 100 parts by weight of acrylic rubber particles obtained by copolymerizing (A-1) 99.9 to 65% by weight of at least one monomer selected from the group consisting of an alkyl acrylate having an alkyl group of 1 to 12 carbon atoms and an alkyl methacrylate having an alkyl group of 4 to 12 carbon atoms, (A-2) 0 to 5% by weight of a polyfunctional monomer having two or more of polymerizable unsaturated bonds in its molecule, (A-3) 0.1 to 10% by weight of a monomer having a polymerizable unsaturated bond and a reactive silyl group in its molecule and (A-4) 0 to 20% by weight of monomer having an unsaturated bond copolymerizable with monomers (A-1) to (A-3) (the sum of (A-1) to (A-4) being 100% by weight) (provided that the monomer (A-2) and (B-3) being not zero at the same time), and thereto graft-polymerizing (C) 0.1 to 5,000 parts by weight of an acrylic rubber precursor comprising (C-1) 99.9 to 75% by weight of at least one monomer selected from the group consisting of an alkyl acrylate having an alkyl group of 1 to 12 carbon atoms and an alkyl methacrylate having an alkyl group of 4 to 12 carbon atoms, (C-2) 0.1 to 5% by weight of a polyfunctional monomer having two or more of polymerizable unsaturated bonds in its molecule and (C-3) 0 to 20% by weight of a monomer having an unsaturated bond copolymerizable with the monomers (C-1) and (C-2) (the sum of monomers (C-1) to (C-3) being 100% by weight).

When the particles are represented only by (D) without being particularly classified by (D1) or (D2), they stand for the both.

In the present invention, it is preferable that an amount of the above-mentioned silicone rubber precursor (B) is from 100 to 500 parts by weight.

In the present invention, it is preferable that an amount of the above-mentioned acrylic rubber precursor (C) is from 100 to 5,000 parts by weight.

Also the present invention relates to graft copolymer particles of silicone-modified acrylic rubber prepared by graft-polymerizing a vinyl monomer to any one of the silicone-modified acrylic rubber particles mentioned above.

In the present invention, it is preferable that the graft copolymer particles of silicone-modified acrylic rubber are those prepared by graft-polymerizing 90 to 10% by weight of the above-mentioned vinyl monomer to 10 to 90% by weight of the above-mentioned silicone-modified acyrlic rubber particles (the sum of the both being 100% by weight).

In the present invention, it is preferable that the graft copolymer particles of silicone-modified acrylic rubber contain 15 to 85% by weight of the above-mentioned silicone-modified acrylic rubber particles and 85 to 15% by weight of the above-mentioned vinyl monomer.

In the present invention, it is preferable that the above-mentioned vinyl monomer is at least one monomer selected from the group consisting of an aromatic vinyl monomer, a vinyl cyanide monomer, an acrylic monomer and a methacrylic monomer.

Further the present invention relates to a thermoplastic resin composition comprising 2 to 60 parts by weight of any of the above-mentioned graft copolymer particles of silicone-modified acrylic rubber and 100 parts by weight of a thermoplastic resin.

In the present invention, it is preferable that the above-mentioned thermoplastic resin is at least one resin selected from the group consisting of poly(vinyl chloride) resin, polystyrene resin, styrene-acrylonitrile copolymer resin, styrene-acrylonitrile-N-phenylmaleimide copolymer resin, α-methylstyrene-acrylonitrile copolymer resin, poly(methyl methacrylate) resin, methyl methacrylate-styrene copolymer resin, polycarbonate resin, polyamide resin, polyester resin and polyphenylene ether-polystyrene composte resin.

BEST MODE FOR CARRYING OUT THE INVENTION

The silicone-modified acrylic rubber particles (D1) of the present invention are silicone-modified acrylic rubber particles prepared by graft-polymerizing; (B) 45 to 5,000 parts by weight of a silicone rubber precursor comprising (B-1) 99.9 to 80% by weight of a low molecular weight organosiloxane (hereinafter referred to as "organosiloxane (B-1)"), (B-2) 0.1 to 10% by weight of a polyfunctional silane compound (hereinafter referred to as "compound (B-2)") and (B-3) 0 to 10% by weight of a reactive silane compound (hereinafter referred to as "compound (B-3)") having a polymerizable unsaturated bond or a mercapto group in its molecule (the sucm of (B-1) to (B-3) being 100% by weight) to (A) 100 parts by weight of acrylic rubber particles (hereinafter referred to as "acrylic rubber particles (A)") obtained by copolymerizing (A-1) 99.9 to 65% by weight of at least one monomer (hereinafter referred to as "monomer (A-1)") selected from the group consisting of an alkyl acrylate having an alkyl group of 1 to 12 carbon atoms and an alkyl methacrylate having an alkyl group of 4 to 12 carbon atoms, (A-2) 0 to 5% by weight of a polyfunctional monomer (hereinafter referred to as "monomer (A-2)") having two or more of polymerizable unsaturated bonds in its molecule, (A-3) 0.1 to 10% by weight of a monomer (hereinafter referred to as "monomer (A-3)") having a polymerizable unsaturated bond and a reactive sily group in its molecule and (A-4) 0 to 20% by weight of a monomer (hereinafter referred to as "monomer (A-4)") having an unsaturated bond copolymerizable with the monomers (A-1) to (A-3) (the sum of (A-1) to (A-4) being 100% by weight) (provided that the monomer (A-2) and the compound (B-3) being not zero at the same time) (The particles obtained at this stage are hereinafter referred to as "acrylic rubber particles (A'), and also the grafted polymer chain of the silicone rubber precursor which is obtained at this stage is referred to as "silicone rubber chain (B')).

Since the silicone-modified acrylic rubber particles (D1) have such a structure that the silicone rubber precursor (B) is graft-polymerized to the trunk, i.e. the above-mentioned acrylic rubber particles, the obtained graft copolymer is one in which the silicone rubber chain is chemically bonded to the acrylic rubber and very finely dispersed without phase separation of the silicone rubber in the acrylic rubber, which is advantageous for giving impact resistance.

In case where the silicone-modified acrylic rubber particles (D1) of the present invention are prepared, there is such an advantage that since the preparation of the acrylic rubber particles (A) at the first step can be carried out through emulsion polymerization, a special apparatus, for example, a high pressure homogenizer is not necessary, and since a conventional plant of the emulsion polymerization can be employed for the preparation, no plant investment is additionally required. In addition thereto, for the control of the rubber particle size which is a very important quality characteristic of an impact modified when prepared by using the graft copolymer, it is possible to follow conventional emulsion polymerization techniques, and therefore, there is an advantage in a point that in the emulsion polymerization method, particle shaving the same size are obtained with a smaller amount of an emulsifying agent than in case of dispersing by a homogenizer and thus there is less possibility of causing a problem with quality which results from the residual emulsifying agent.

The above-mentioned monomer (A-1) used for the preparation of the acrylic rubber particles (A) is a component used for forming a main structure of the acrylic rubber particles (A). Examples thereof are, for instance, an alkyl acrylate having an alkyl group of 1 to 12 carbon atoms such as methyl acrylate, ethyl acrylate, propyl acrylate, n-butyl acrylate or 2-ethylhexyl acrylate and an alkyl methacrylate having an alkyl group of 4 to 12 carbon atoms such as 2-ethylhexyl methacrylate or lauryl methacrylate. Those monomers may be used solely or in a mixture of two or more thereof. Among them, preferable from the viewpoint of low glass transition temperature of the obtained polymer and form economical point of view is a combination use of n-butyl acrylate and a copolymerizable component therewith. In that combination use, the content of n-butyl acrylate is from 60 to 100% (% by weight, hereinafter the same), preferably from 80 to 100%. As the copolymerizable component, there are, for example, methyl acrylate, ethyl acrylate, 2-ethylhexyl acrylate and the like.

The above-mentioned monomer (A-2) is a component used for giving rubber elasticity by introducing crosslinking bonds to the acrylic rubber particles (A) and for forming a network structure and in addition, used as a graft-linking agent for providing an active site to graft the vinyl monomer described hereinafter and an active site to graft the acrylic rubber precursor (C) described hereinafter in the silicone-modified acrylic rubber particle (D2). Examples thereof are, for instance, allyl methacrylate, diallyl phthalate, trially cyanurate, triallyl isocyanurate, ethylene glycol dimethacrylate, divinylbenzene and the like. Those may be used solely or in a mixture of two or more thereof. Among them from the viewpoints of a good crossliking efficiency and grafting efficiency, allyl methacrylate, diallyl phthalate, triallyl cyanurate and trially isocyanurate are more preferable.

The above-mentioned monomer (A-3) is, by its polymerizable unsaturated bond, copolymerized with the monomer (A-1) or the like to give a copolymer, and as a result, a reactive silyl group is introduced to the side chain or end of the copolymer. This reactive silyl group acts as the active site to graft the silicone rubber precursor (B) to be polymerized at the next step.

Examples of the above-mentioned monomer (A-3) are a monomer represented by the formula (1):

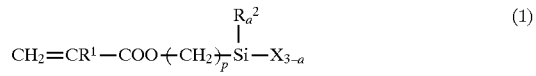

wherein $R^1$ is hydrogen atom or methyl, $R^2$ is a monovalent hydrocarbon group having 1 to 6 carbon atoms such as methyl, ethyl, propyl or phenyl, X is an alkoxyl group such as methoxy, ethoxy, propoxy or butoxy, a is 0, 1 or 2, p is an integer of 1 to 6; the formula (2):

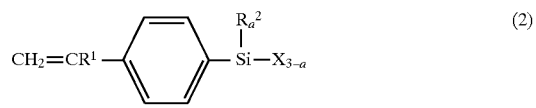

wherein $R^1$, $R^2$, X and a are the same as above; the formula (3):

wherein $R^1$, $R^2$, X and a are the same as above; and the like.

Examples of the monomer represented by the formula (1) are β-methacryloyloxyethyldimethoxymethylsilane, γ-methacryloyloxypropyldimethoxymethylsilane, γ-methacryloyloxypropyltrimethoxysilane, γ-methacryloyloxypropyldimethylmethoxysilane, γ-methacryloyloxypropyltriethoxysilane, γ-methacryloyloxypropyldiethoxymethylsilane, γ-methacryloyloxypropyltripropoxysilane, γ-methacryloyloxypropyldipropoxymethylsilane and the like.

Also examples of the monomer represented by the formula (2) are p-vinylphenyldimethoxymethylsilane, p-vinylphenyltrimethoxysilane, p-vinylphenyltriethoxysilane, p-vinylphenyldiethoxymethylsilane and the like.

Further, examples of the monomer represented by the formula (3) are vinyltrimethoxysilane, vinyltriethoxysilane and the like.

The monomer (A-4) copolymerizable with the monomers (A-1) to (A-3) is a component for adjusting a refractive index of the resulting rubber. Examples thereof are methacrylic acid; a methacrylate monomer (provided that methacrylate monomer other than that exemplified as the monomer (A-1)) such as methyl methacrylate, ethyl methacrylate, glycidyl methacrylate, hydroxyethyl methacrylate or benzyl methacrylate; an aromatic vinyl monomer such as styrene or α-methylstyrene; a vinyl cyanide monomer such as acrylonitrile or methacrylonitrile and the like. Those may be used solely or in a combination use of two or more thereof.

The proportion of the monomers (A-1) to (A-4) for preparing the acrylic rubber particles (A) is 99.9 to 65% of the monomer (A-1), 0 to 5% of the monomer (A-2), 0.1 to 10% of the monomer (A-3) and 0 to 20% of the monomer (A-4) (the sum of them being 100%), preferably 99.8 to 70% of the monomer (A-1), 0.1 to 5% of the monomer (A-2), 0.3 to 5% of the monomer (A-3) and 0 to 10% of the monomer (A-4), more preferably 99.7 to 84% of the monomer (A-1), 0.3 to 3% of the monomer (A-2), 1 to 5% of the monomer (A-3) and 0 to 7% of the monomer (A-4).

When the proportion of the monomer (A-1) is less than 65%, rubber elasticity becomes lowered and then impact resistance is lowered.

Though the monomer (A-2) is an optional component, by the use of it in the above-mentioned range, a moderate crosslinking density is obtained and impact resistance is enhanced. The proportion of both the monomer (A-2) and the monomer (B-3) mentioned hereinafter does not become 0% at the same time.

When the proportion of the monomer (A-3) is less than 0.1%, a grafting amount of the silicone rubber precursor (B) in the obtained acrylic rubber particles (A) is low, which is a cause for lowering of impact resistance. When more than 10%, at the time of graft polymerization of the silicone rubber precursor (B) under acidic condition, self-condensation reaction between the reactive silyl groups increases in addition to the above-mentioned graft polymerization, a crosslinking density of the rubber becomes too high and the impact resistance is then lowered.

Though the monomer (A-4) is an optional component, by the use of it in the above-mentioned range, a refractive index and impact resistance of the obtained silicone-modified acrylic rubber particles can be adjusted.

The acrylic rubber particles (A) in the present invention can be obtained from an emulsion prepared by polymerizing the above-mentioned monomers (A-1) to (A-4) at the proportion mentioned above through usual emulsion polymerization method (for example, methods described in JP-A-88169/1975 and JP-A-141746/1986). The emulsifying agent used for the emulsion polymerization method must be one which does not lose activity as the emulsifying agent even when used in an acidic range. Examples thereof are sodium alkylbenzenesulfonate, sodium alkyl sulfate, sodium paraffinsulfonate, sodium alkylsulfosuccinate and the like. Sodium salts of fatty acid having a long chain, such as sodium oleate and sodium palmitate are not preferable because activity as the emulsifying agent is lost in an acidic range.

A polymerization initiator used in the above-mentioned emulsion polymerization method and a chain transfer agent are not particularly limited. When compounds having a reactive silyl group are used as the polymerization initiator and chain transfer agent, the acrylic rubber particles (A) having a reactive silyl group at the end of the molecular chain can be prepared.

Examples of the polymerization initiator having a reactive silyl group are:

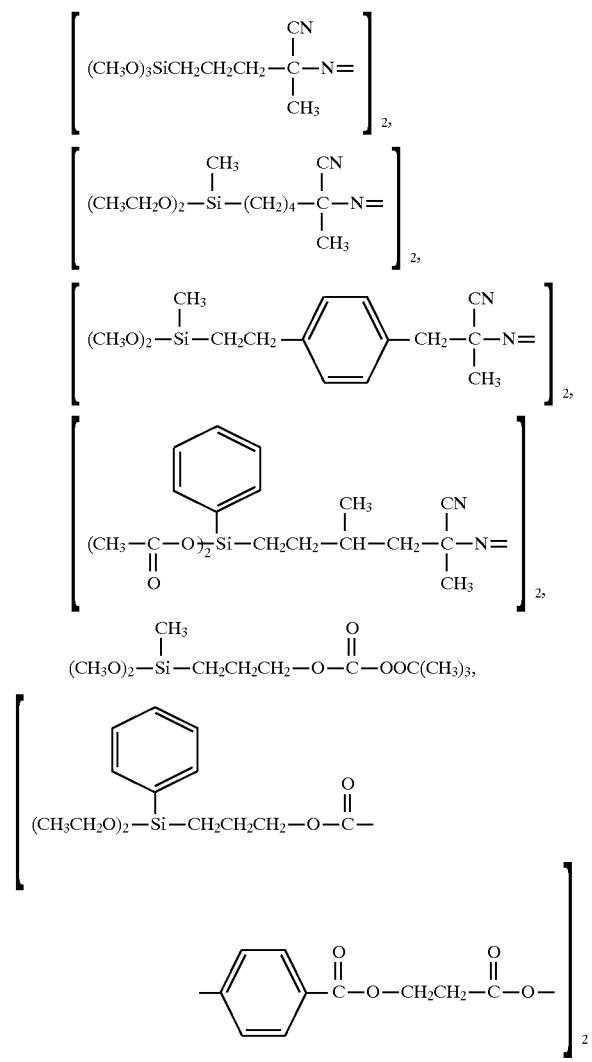

As the chain transfer agents having a reactive silyl group, there are, for example, those represented by the formula (4):

$$HS-R^3-\underset{\underset{X_{3-a}}{|}}{\overset{\overset{R_a^2}{|}}{Si}}\quad\quad\quad (4)$$

wherein $R^2$, X and a are the same as above, $R^3$ is a divalent organic group such as an alkylene group having 1 to 18 carbon atoms, and the formula (5):

$$\left(X_{3-a}-\underset{\underset{}{|}}{\overset{\overset{R_a^2}{|}}{Si}}-R^3-S-\right)_2 \quad\quad (5)$$

wherein $R^2$, $R^3$, X and a are the same as above. Examples of the chain transfer agent represented by the formula (4) are, for instance, mercaptopropyltrimethoxysilane, mercaptopropyldimethoxymethylsilane and the like.

The particle size of the acrylic rubber particles (A) can be regulated according to usual emulsion polymerization technique by, for example, increasing or decreasing an amount of the emulsifying agent. The particle size is from 20 to 1,000 nm, preferably from 40 to 500 nm, from a point of giving impact resistance.

The acrylic rubber particles (A) prepared in this manner are ones obtained by random-copolymerizing the monomer (A-1), the monomer (A-2), the monomer (A-3) and the monomer (A-4) copolymerizable with those monomers (it is a matter of course that the monomers (A-2) and (A-4) are not contained when not used them), and further having a structure in which it is crosslinked at a part of reactive groups existing in the monomers (A-2) and (A-3). The particles (A) maintain physical and chemical properties of conventional elastic acrylic rubber, and the remaining reactive groups are active sites being capable of reacting with the silicone rubber precursor (B).

The above-mentioned acrylic rubber particles (A') prepared by graft-polymerizing the silicone rubber precursor (B) are produced by condensation polymerization of the silicone rubber precursor (B) in the presence of an emulsion containing the acrylic rubber particles (A) prepared in the manner mentioned above.

The silicone rubber precursor (B) comprises the organosiloxane (B-1) mainly, the compound (B-2) and the compound (B-3), if necessary. The silicone rubber precursor (B) forms the silicone rubber chain (B') through graft polymerization to the acrylic rubber particles (A), and is used to introduce the component having a low glass transition temperature and being excellent in weather resistance to the acrylic rubber particles (A), thereby improving impact resistance and weather resistance. The silicone rubber precursor (B) is the most characteristic component of the present invention as mentioned above.

The above-mentioned organosiloxane (B-1) as a main material of the silicone rubber precursor (B) is a component composing the main structure of the silicone rubber chain (B'). Usable examples are those having straight chain and branched chain, and preferable are cyclic siloxanes from the viewpoint of applicability to an emulsion polymerization system and from economical point of view. Examples of the cyclic siloxanes are those having six- to twelve-membered ring, such as hexamethylcyclotrisiloxane, octamethylcyclotetrasiloxane, decamethylcyclopentasiloxane and dodecamethylcyclohexasiloxane. Bifunctional alkoxysilane can also be used as the above-mentioned organosiloxane (B-1). Examples thereof are dimethoxydimethylsilane, diethoxydimethylsilane and the like. Further there can be a combination use of a low molecular weight organosiloxane and the bifunctional alkoxysilane.

The above-mentioned compound (B-2) acts as a crosslinking agent for crosslinking the silicone rubber chain (B'), and is a component for giving rubber elasticity. Examples thereof are tetramethoxysilane, tetraethoxysilane, triethoxymethylsilane, triethoxyethylsilane and the like.

The above-mentioned compound (B-3) acts as a graft-linking agent, and is a component for providing an active site to graft the vinyl monomer described hereinafter, and in case of the silicone-modified acrylic rubber particles (D2), an active site to graft the acrylic rubber precursor (C). As the examples thereof, there can be used the same one as the monomer (A-3) used in producing the acrylic rubber particles (A) or the reactive silane represented by the above-mentioned formula (4) and having a mercapto group in its molecule. When the reactive silane is of trialkoxysilane type, it can be used as a graft-linking agent and crosslinking agent. In addition, there can be used cyclic siloxanes having an unsaturated bond in the molecule thereof, for example, tetravinyltetramethylcyclotetrasiloxane, tetramethacryloyloxypropyltetramethylcyclotetrasiloxane, and the like.

The proportion of (B-1) to (B-3) used as the silicone rubber precursor (B) is 99.9 to 80% of organosiloxane (B-1), 0.1 to 10% of the compound (B-2) and 0 to 10% of the compound (B-3) (the sum of them being 100%), preferably 99.5 to 93% of organosiloxane (B-1), 0.5 to 5% of the compound (B-2) and 0 to 3% of the compound (B-3).

When the proportion of organosiloxane (B-1) is less than 80%, a crosslinking density becomes too high and thus, impact resistance is lowered.

When the proportion of the compound (B-2) is less than 0.1%, a crosslinking density is too low to give suitable property as a rubber and impact resistance is at a lower level. On the contrary, when more than 10%, a crosslinking density becomes too high, and also in that case, impact resistance is lowered.

In case of the silicone-modified acrylic rubber particles (D2), the compound (B-3), after polymerized, becomes an active site for graft-polymerizing the acrylic rubber precursor (C) mentioned hereinafter. In case where the polyfunctional monomer (A-2) has been copolymerized as the active site for grafting in the acrylic rubber particles (A), the compound (B-3) is not necessarily required to be used. From this point of view, the compound (B-3) is an optional component. In order to increase the graft efficiency, it is preferable to use the compound (B-3). When the proportion of the compound (B-3) exceeds 10%, a crosslinking density becomes too high and thereby causing lowering of impact resistance, which is not preferable.

The graft polymerization of the silicone rubber precursor (B) to the above-mentioned acrylic rubber particles (A) can be carried out by, for example, adding batchwise the solution containing a mixture of the organosiloxane (B-1), the compound (B-2) and if necessary, the compound (B-3) into an emulsion containing the acrylic rubber particles (A) and then heating after pH of the system is adjusted to 2 to 4 with alkylbenzenesulfonic acid or sulfuric acid. The pH may be lowered after adding batchwise the mixture solution of (B-1) to (B-3) and stirring for a given period of time. Also the graft polymerization can be carried out by dividedly adding the silicone rubber precursor (B) to the emulsion with a lowered pH containing the acrylic rubber particles (A).

In case of the above-mentioned batchwise or divided addition, the silicone rubber precursor (B) can be used as it is or in the form of emulsion by mixing with water and an emulsifying agent. From the viewpoint of a polymerization rate, it is preferable to employ the addition method in the form of emulsion.

An amount of the silicone rubber precursor (B) is from 45 to 5,000 parts (part by weight, hereinafter the same), preferably from 100 to 500 parts, more preferably from 100 to 200 parts on the basis of 100 parts of the acrylic rubber particles (A), from the viewpoint of production efficiency and from a point of giving impact resistance.

When the amount of the silicone rubber precursor (B) is less than 4 5 parts, the conversion is decreased and unreacted silicone rubber precursor (B) remains, thus lowering the production efficiency. When more than 5,000 parts, in case where the silicone rubber precursor (B) is added as it is to the emulsion containing the acrylic rubber particles (A), phase separation of the silicone rubber precursor (B) arises to lower the polymerization efficiency, and in case where the emulsified silicone rubber precursor (B) is added, particles comprising the silicone rubber only are formed to lower impact resistance.

The silicone rubber chain (B') formed in the polymerization step has a network structure obtained by random copolymerization of the organosiloxane (B-1) and the compound (B-3) used as occasion demands, and reaction of the formed trunk chain with the compound (B-2) (a crosslinking agent) for crosslinking. A part of its end is grafted to the reactive silyl group being present on the side chain of the acrylic rubber particles (A) to form chemical bonds.

In the manner mentioned above, the silicone-modified acrylic rubber particles (D1), in which the silicone rubber precursor (B) is graft-polymerized, can be prepared.

In order to obtain the silicone-modified acrylic rubber particles (D2) having a low content of a silicone rubber, the acrylic rubber precursor (C) is graft-polymerized in the presence of an emulsion containing the silicone-modified acrylic rubber particles (D1).

To produce the silicone-modified acrylic rubber particles (D2), first the silicone-modified acrylic rubber particles (D1) are prepared by graft-polymerizing the silicone rubber precursor (B) by using the acrylic rubber particles (A) as a trunk and the reactive silyl group derived from the monomer (A-3) as an active site. Then the silicone-modified acrylic rubber particles (D2) can be obtained by graft-polymerizing the acrylic rubber precursor (C) by using, as an active site, a polymerizable unsaturated bond derived from at least one of the monomer (A-2) and the compound (B-3), which are present in the obtained silicone-modified acrylic rubber particles (D1).

The silicone-modified acrylic rubber particles (D2) are most characterized in that the silicone rubber chain (B') is introduced into the acrylic rubber particles (A) through covalent bonding. It seems that, because the acrylic rubber precursor (C) is graft-polymerized after the silicone rubber chain (B') is introduced, the particles (D2) have, for example, such a structure that the silicone rubber is usually being dispersed so finely in the acrylic rubber.

Also though it is not clear, the silicone-modified acrylic rubber particles (D2) of the present invention can be considered to make a large contribution to giving impact resistance because it has such a structure as mentioned above.

The structure of the silicone-modified acrylic rubber particles (D2) of the present invention is then explained more concretely.

The formula (I):

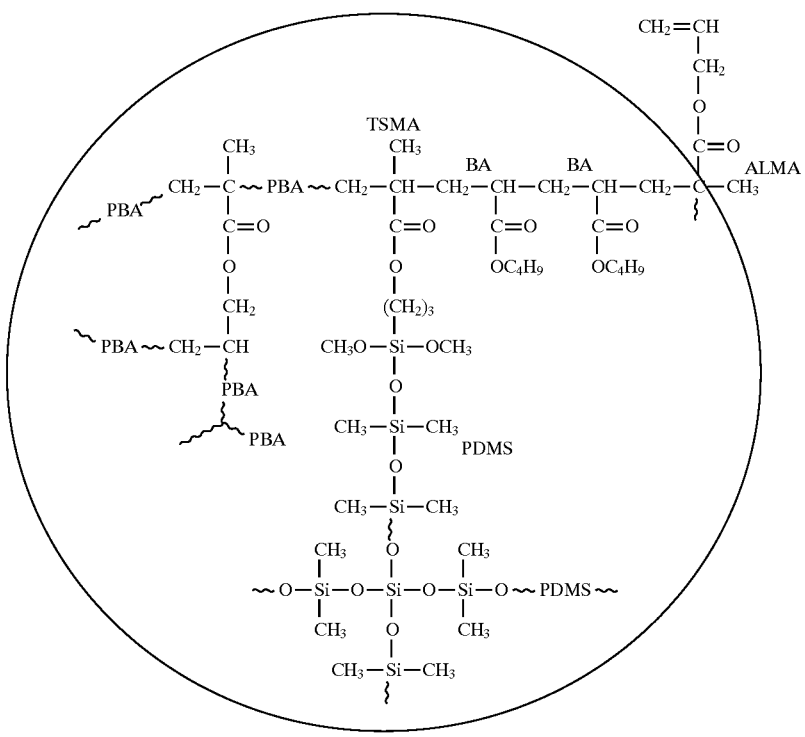

shows an example for explaining a part of the structure of the silicone-modified acrylic rubber (D2) of the present invention. In the formula (I), a circle shown by a continuous line and "～" diagrammatically indicate the profile of the silicone-modified acrylic rubber particles (D1) and the polymer chains obtained from each monomer, respectively. BA stands for n-butyl acrylate, ALMA stands for allyl methacrylate, TSMA stands for γ-methacryloyloxypropyltrimethoxysilane, PBA stands for poly(n-butyl acrylate), and PDMS stands for polydimethylsiloxane.

The silicone-modified acrylic rubber particles have a structure obtained in such a manner that first BA as a main component is copolymerized with ALMA and TSMA to form the acrylic rubber particles (A), then the silicone rubber chain (B') is introduced by graft-polymerizing, for example, hexamethylcyclotrisiloxane by using a trimethoxysilyl group of TSMA as an active site, and the acrylic rubber precursor such as BA is graft-polymerized by using allyl group of ALMA as an active site (the polymer chain obtained by graft polymerization of the acrylic rubber precursor (C) is not shown in the formula (I)).

In preparing the silicone-modified acrylic rubber particles (D2) of the present invention, there is such an advantage that since the acrylic rubber particles (A) can be prepared at the first step through usual emulsion polymerization, a special apparatus such as a high pressure homogenizer is not necessary, and since the particles (A) can be prepared by a conventional plant for the emulsion polymerization method, no investment is necessary. In addition, for the regulation of the rubber particle size which is a very important quality characteristic when preparing, from the silicone-modified acrylic rubber particles (D2), the graft copolymer particles (F) of silicone-modified acrylic rubber useful as an impact modifier described hereinafter, it is possible to follow a conventional emulsion polymerization technique. Also there is an advantage in a point that in the emulsion polymerization method, the particles having the same size are obtained with a smaller amount of an emulsifying agent than in dispersing by a homogenizer and thus there is less possibility of causing a problem with quality which results from the residual emulsifying agent.

The acrylic rubber precursor (C) comprises the monomers (C-1), (C-2) and (C-3) (of course (C-3) is not contained when it is not used), and is used for forming the silicone-modified acrylic rubber particles, being grafted to the acrylic rubber component (A) (and/or the silicone rubber precursor (B) when the graft crosslinking agent is used in the silicone rubber chain (B')) in the silicone-modified acrylic rubber particles (D1) and for adjusting an amount of the silicone rubber chain (B') in the silicone-modified acrylic rubber particles (D2) without lowering the conversion of the silicone rubber precursor (B). Therefore, the component (C) is not necessary in case where preparing the silicone-modified acrylic rubber particles having a high concentration of the silicone rubber chain (B'). The component (C) is usually used in case where the content of the silicone rubber chain (B') is not more than 30%, preferably not more than 40% (based on the weight of the siliconemodified acrylic rubber particles (D2)).

As the monomers (C-1), (C-2) and (C-3), there can be used the same monomers used as (A-1), (A-2) and (A-4), respectively which are employed in producing the acrylic rubber particles (A).

The proportion of the monomers (C-1) to (C-3) used as the acrylic rubber precursor (C) is 99.9 to 75% of the monomer (C-1), 0.1 to 5% of the monomer (C-2) and 0 to 20% of the monomer (C-3) (the sum of these monomers being 100%), preferably 99.8 to 75% of the monomer (C-1), 0.1 to 5% of the monomer (C-2) and 0 to 10% of the monomer (C-3), further preferably 99.7 to 84% of the monomer (C-1), 0.3 to 3% of the monomer (C-2) and 0 to 7% of the monomer (C-3).

When the monomer (C-1) is less than 75%, rubber elasticity is lowered to decrease impact resistance.

The reasons for limiting the proportion of the monomers (C-2) and (C-3) in the range mentioned above are the same as in the cases of the monomers (A-2) and (A-4).

The silicone-modified acrylic rubber particles (D2) can be prepared through usual emulsion polymerization method after neutralizing the pH of an emulsion containing the acrylic rubber particles (A'). In that case, an alkali metal salt of fatty acid can also be used as an emulsifying agent unlike the polymerization for preparing the acrylic rubber particles (A) at the first step.

An amount of the acrylic rubber precursor (C) is from 0.1 to 5,000 parts, preferably from 100 to 5,000 parts on the basis of 100 parts of the acrylic rubber particles from a point of giving impact resistance.

The silicone-modified acrylic rubber particles (D2) of the present invention, which can be prepared through the usual emulsion polymerization method as mentioned above, have such a structure as represented by the formula (I). Namely, the silicone-modified acrylic rubber particles (D2) have a skeleton of a trunk chain comprising a polymer of the monomers (A-1) and (C-1), which reacts with the monomers (A-2) and (C-2) to be crosslinked, and thus have the network structure. All of the unsaturated bonds of the monomers (A-2) and (C-2) are not used in the polymerization, and a part thereof is present in the skeleton of the above-mentioned trunk chain in the form of side chain having unsaturated bonds and also becomes an active site for the graft polymerization of the vinyl monomer (E) described hereinafter. The monomer (A-3) is also copolymerized as a part of the skeleton comprising the trunk chain. Also there is chemical bonding between the silicone rubber chain (B') and the reactive silyl group derived from the monomer (A-3) and present in the side chain.

The silicone rubber chain (B') has a skeleton of polyorganosiloxane, and crosslinking points are formed by the monomer (B-2) to provide a network structure.

Namely, on the silicone-modified acrylic rubber particles (D), there exist simultaneously the network structure of the acrylic rubber particles (A) and the network structure formed by the silicone rubber chain (B'), and chemical bonding is present between the acrylic rubber particles (A) and the silicone rubber chain (B').

Therefore, insoluble portion in an organic solvent (usually called "gel content") in the silicone-modified acrylic rubber particles (D) is not less than 85%.

The graft copolymer particles of silicone-modified acrylic rubber (hereinafter referred to as "graft copolymer particles (F)") are prepared by graft-polymerizing the vinyl monomer (hereinafter referred to as "vinyl monomer (E)") to the so-prepared silicone-modified acrylic rubber particles (D).

The vinyl monomer (E) is used, in case of blending the silicone-modified acrylic rubber particles (D) and the thermoplastic resin described hereinafter, to be graft-polymerized to the silicone-modified acrylic rubber particles (D) for the purposes of obtaining compatibility with the thermoplastic resin and homogeneously dispersing the silicone-modified acrylic rubber particles (D) in the thermoplastic resin. Examples of the vinyl monomer (E) are an aromatic vinyl monomer such as styrene, α-methylstyrene or para-methylstyrene; a vinyl cyanide monomer such as acrylonitrile or methacrylonitrile; a methacrylic monomer such as methacrylic acid, methyl methacrylate, ethyl methacrylate, butyl methacrylate, glycidyl methacrylate or hydroxyethyl methacrylate; an acrylic monomer such as acrylic acid, methyl acrylate, butyl acrylate, glycidyl acrylate or hydroxyethyl acrylate; and the like. These monomers may be used solely or in a mixture of two or more thereof.

The graft polymerization of the vinyl monomer (E) to the silicone-modified acrylic rubber particles (D) is conducted through usual emulsion polymerization method. The emulsion of the graft polymer particles (F) obtained through the above-mentioned emulsion polymerization is coagulated with a metal salt such as calcium chloride, magnesium chloride, magnesium sulfate or the like and then filtered and dried to collect in the form of powder of the graft copolymer particles (F).

The proportion of the silicone-modified acrylic rubber particles (D) in the graft copolymer particles (F) of silicone-modified acrylic rubber is from 10 to 90%, preferably from 15 to 85% from a point of giving impact resistance.

When the proportion of the silicone-modified acrylic rubber particles (D) is less than 10%, there is a tendency that the content of the rubber component becomes too low and sufficient impact resistance cannot be given. When more than 90%, an amount of the monomer to be grafted is small, and when blended with the thermoplastic resin, compatibility with the thermoplastic resin as a matrix resin is not good, and thus impact resistance tends to be lowered.

The so-prepared graft copolymer particles (F) of silicone-modified acrylic rubber is useful as an impact modifier, and is blended to various thermoplastic resins (hereinafter referred to as "thermoplastic resin (G)") to give the thermoplastic resin composition having the improved impact resistance (hereinafter referred to as "thermoplastic resin composition (H)").

Examples of the thermoplastic resin (G) are, for instance, poly(vinyl chloride) resin, polystyrene resin, styrene-acrylonitrile copolymer resin, styrene-acrylonitrile-N-phenylmaleimide copolymer resin, α-methylstyrene-acrylonitrile copolymer resin, poly(methyl methacrylate) resin, methyl methacrylate-styrene copolymer resin, polycarbonate resin, polyamide resin, polyester resin such as polyethylene terephthalate or polybutylene terephthalate resin, polyphenylene ether-polystyrene composite resin and the like.

It is preferable that a blending amount of the graft copolymer particles (F) is from 2 to 60 parts, more preferably from 5 to 30 parts on the basis of 100 parts of the thermoplastic resin (G) from the viewpoint of balanced physical properties of molded articles.

The thermoplastic resin composition (H) of the present invention is prepared, for example, by mixing the thermoplastic resin (G) and the graft copolymer particles (F) as the impact modifier in the form of powder to powder, powder to pellet or powder to flake by the use of, for example, a Henschel mixer, ribbon blender or the like, and then melt-kneading with rolls, extruder or kneader.

In that case, additives to be usually used can be blended, for example, a plasticizer, stabilizer, lubricant, ultraviolet ray absorber, antioxidant, flame retarder, pigment, glass fiber, filler and the like.

In case where the thermoplastic resin (G) is produced through the emulsion polymerization to improve its impact resistance, it is possible to obtain the thermoplastic resin composition (H) by blending the thermoplastic resin (G) and the graft copolymer particles (F) both in the form of emulsion and then co-coagulating them.

As the method of molding the thus obtained thermoplastic resin composition (H), there are usual methods of molding a thermoplastic resin composition, for example, injection molding, extrusion molding, blow molding, calender molding and the like.

The obtained moldings are excellent particularly in impact resistance and weather resistance as compared with those containing a conventional impact modifier.

As the silicone-modified acrylic rubber particles (D1) of the present invention, for example, the following ones are preferable.

Silicone-modified acrylic rubber particles (hereinafter referred to as "silicone-modified acrylic rubber particles (D1-1)") prepared by graft-polymerizing, to 100 parts of the acrylic rubber particles (A) prepared by copolymerizing:

| | |
|---|---|
| • Monomer (A-1) | 99.9 to 65%, |
| • Monomer (A-2) | 0 to 5%, |
| • Monomer (A-3) | 0.1 to 10% and |
| • Monomer (A-4) | 0 to 20%, |

45 to 5,000 parts of the silicone rubber precursor (B) comprising:

| | |
|---|---|
| • Organosiloxane (B-1) | 99.9 to 80%, |
| • Compound (B-2) | 0.1 to 10% and |
| • Compound (B-3) | 0 to 10%. |

The obtained silicone-modified acrylic rubber particles (D1-1) are advantageous from the viewpoint that no special plant is necessary.

More preferably, there are the silicone-modified acrylic rubber particles (hereinafter referred to as "silicone-modified acrylic rubber particles (D1-2)") which are excellent in weather resistance and prepared by graft-polymerizing, to 100 parts of acrylic rubber particles (A) prepared by copolymerizing:

| | |
|---|---|
| • Monomer (A-1) | 99.9 to 65%, |
| • Monomer (A-2) | 0 to 5%, |
| • Monomer (A-3) | 0.1 to 10% and |
| • Monomer (A-4) | 0 to 20%, |

45 to 5,000 parts of the silicone rubber precursor (B) comprising:

| | |
|---|---|
| • Organosiloxane (B-1) comprising cyclic siloxane | 99.9 to 80%, |
| • Compound (B-2) comprising tetraalkoxysilane or trialkoxyalkylsilane and | 0.1 to 10% |
| • Compound (B-3) having polymerizable unsaturated bond and reactive silyl group in its molecule or compound which comprises a reactive silane or cyclic siloxane having mercapto group in its molecule and shown by the formula (4) | 0 to 10%. |

As the graft copolymer particles (F) of silicone-modified acrylic rubber of the present invention, there are, for example, the following ones.

Graft copolymer particles of silicone-modified acrylic rubber (hereinafter referred to as "graft copolymer particles (F1-1) of silicone-modified acrylic rubber") which are prepared by graft-polymerizing the vinyl monomer (E) to the above-mentioned silicone-modified acrylic rubber particles (D1-1) and are advantageous from a point of giving good impact resistance and weather resistance to the thermoplastic resin.

More preferable are graft copolymer particles of a silicone-modified acrylic rubber (hereinafter referred to as "graft copolymer particles (F1-2) of the silicone-modified acrylic rubber") which are excellent in dispersibility in the thermoplastic resin (G) and are prepared by graft-polymerizing, to the above-mentioned silicone-modified acrylic rubber particles (D1-2), the vinyl monomer (E1) comprising the aromatic vinyl monomer, vinyl cyanide monomer, acrylic monomer, methacrylic monomer or a mixture of two or more thereof.

Further as the thermoplastic resin (H) of the present invention, for example, the following one is preferable.

The thermoplastic resin composition comprising 2 to 60 parts of the graft copolymer particles (F1-1) of the silicone-modified acrylic rubber and 100 parts of the thermoplastic resin (G) is advantageous from a point that molded articles having good impact resistance and weather resistance can be provided.

As the silicone-modified acrylic rubber particles (D2) of the present invention, for example, the following ones are preferable.

Silicone-modified acrylic rubber particles (hereinafter referred to as "silicone-modified acrylic rubber particles (D2-1)") prepared by graft-polymerizing, to 100 parts of the acrylic rubber particles (A) prepared by copolymerizing:

| | |
|---|---|
| • Monomer (A-1) | 99.9 to 65%, |
| • Monomer (A-2) | 0 to 5%, |
| • Monomer (A-3) | 0.1 to 10% and |
| • Monomer (A-4) | 0 to 20%, |

45 to 5,000 parts of the silicone rubber precursor (B) comprising:

| | |
|---|---|
| • Organosiloxane (B-1) | 99.9 to 80%, |
| • Compound (B-2) | 0.1 to 10% and |
| • Compound (B-3) | 0 to 10% | and further thereto 0.1 to 5,000 parts of the acrylic rubber precursor (C) comprising:

| | |
|---|---|
| • Monomer (C-1) | 99.9 to 75%, |
| • Monomer (C-2) | 0.1 to 5% and |
| • Monomer (C-3) | 0 to 20%. |

The obtained silicone-modified acrylic rubber particles (D2-1) are advantageous from the viewpoints that no special plant is necessary and a conversion is high.

More preferably, there are silicone-modified acrylic rubber particles (hereinafter referred to as "silicone-modified acrylic rubber particles (D2-2)") which is excellent in weather resistance and prepared by graft-polymerizing, to 100 parts of acrylic rubber particles (A) prepared by copolymerizing:

| | |
|---|---|
| • Monomer (A-1) | 99.9 to 65%, |
| • Monomer (A-2) | 0 to 5%, |
| • Monomer (A-3) | 0.1 to 10% and |
| • Monomer (A-4) | 0 to 20%, |

45 to 5,000 parts of the silicone rubber precursor (B) comprising:

| | |
|---|---|
| • Organosiloxane (B-1) comprising cyclic siloxane | 99.9 to 80%, |
| • Compound (B-2) comprising tetraalkoxysilane or trialkoxyalkylsilane (B-2) and | 0.1 to 10% |
| Compound (B-3) having polymerizable unsaturated bond and reactive silyl group in its molecule or compound which comprises a reactive silane or cyclic siloxane having mercapto group in its molecule and shown by the formula (4) | 0 to 10% | and further thereto 0.1 to 5,000 parts of the acrylic rubber precursor (C) comprising:

| | |
|---|---|
| • Monomer (C-1) | 99.9 to 75%, |
| • Monomer (C-2) | 0.1 to 5% and |
| • Monomer (C-3) | 0 to 20%. |

As the graft copolymer particles (F) of silicone-modified acrylic rubber of the present invention, there are, for example, the following ones.

Graft copolymer particles of silicone-modified acrylic rubber (hereinafter referred to as "graft copolymer particles (F2-1) of silicone-modified acrylic rubber") which are prepared by graft-polymerizing the vinyl monomer (E) to the above-mentioned silicone-modified acrylic rubber particles (D2-1) and are advantageous from point of giving good impact resistance and weather resistance to the thermoplastic resin.

More preferable are graft copolymer particles of silicone-modified acrylic rubber (hereinafter referred to as "graft copolymer particles (F2-2) of silicone-modified acrylic rubber") which are excellent in dispersibility in the thermoplastic resin (G) and are prepared by graft-polymerizing, to the above-mentioned silicone-modified acrylic rubber particles (D2-2), the vinyl monomer (E1) comprising the aromatic vinyl monomer, vinyl cyanide monomer, acrylic monomer, methacrylic monomer or a mixture of two or more thereof.

Further as the thermoplastic resin (H) of the present invention, for example, the following one is preferable.

The thermoplastic resin composition comprising 2 to 60 parts of the graft copolymer particles (F2-1) of the silicone-modified acrylic rubber and 100 parts of the thermoplastic resin (G) is advantageous from a point that molded articles having good impact resistance and weather resistance can be provided.

The present invention is then explained concretely based on Examples, but is not limited thereto.

Tests employed in Examples and Comparative Examples were carried out in the manner mentioned below.

Izod impact strength: Measurement was made at 0° C. and 23° C. in accordance with ASTM D-256 by using ¼ inch notched bar.

With respect to a test specimen exposed for 300 hours in a sunshine weather-Ometer, measurement was made in the same manner as mentioned above.

Gel Content: A test specimen was immersed in toluene with stirring at room temperature for eight hours, followed by centrifuging at 12,000 rpm for 60 minutes to measure a weight percentage of insoluble portion in toluene.

Also the conversion was measured in the manner mentioned below.

The conversion of the component (A) was obtained by drying the solid (A) in the emulsion in an oven at 120° C. (for one hour) and using the equation of [(Amount of solid (A))/(Amount of charged monomer (A))]×100 (%).

The conversion of the component (B) was obtained by drying the solid (A+B) in the emulsion in the same manner as above and by using the equation of [(Amount of solid (A+B)−Amount of solid (A))/(Amount of charged monomer (B))]×100 (%).

The conversion of the component (C) was obtained by drying the solid (A+B+C) in the emulsion in the same manner as above and using the equation of [(Amount of solid (A+B+C)−Amount of solid (A+B))/(Amount of charged monomer (C))]×100 (%).

EXAMPLE 1 AND COMPARATIVE EXAMPLE 1

(1) Preparation of silicone-modified acrylic rubber (D1).

A five-necked flask equipped with a stirrer, reflux condenser, nitrogen-introducing port, monomer-feeding port and thermometer was charged batchwise with the components shown in Table 1.

TABLE 1

| Components | Amount (Parts) |
| --- | --- |
| Deionized water | 250 |
| Sodium dodecylbenzenesulfonate (SDBS) | 0.4 |
| Sodium formaldehydesulfoxylate (SFS) | 0.4 |
| Ferrous sulfate | 0.005 |
| Disodium ethylenediaminetetraacetate (EDTA) | 0.01 |

Then the system was heated up to 40° C. with replacing by nitrogen gas and the mixture described in Table 2 was added over four hours. After the completion of the addition, stirring was continued for one hour to complete the polymerization. The conversion was 99.5%. During the polymerization, 0.2 part of SDBS was added dividedly one hour after, two hours after and three hours after. The average size of the acrylic rubber particles was 130 nm.

TABLE 2

| Components | Amount (Parts) |
| --- | --- |
| n-Butyl acrylate (BA) | 50 |
| Allyl methacrylate (ALMA) | 0.25 |
| γ-Methacryloyloxypropyltrimethoxysilane (TSMA) | 0.5 |
| Cumene hydroperoxide (CHP) | 0.1 |

Separately, an emulsion was prepared by stirring a mixture as a silicone rubber material (silicone rubber precursor) shown in Table 3 at 10,000 rpm for 10 minutes by means of a homomixer.

TABLE 3

| Components | Amount (Parts) |
| --- | --- |
| Deionized water | 90 |
| SDBS | 0.7 |
| Octamethylcyclotetrasiloxane (D4) | 50 |
| Tetraethoxysilane (TES) | 1 |

The above-mentioned emulsion of the silicone rubber material was added batchwise to the acrylic rubber emulsion. After the system was heated up to 80° C. over about 30 minutes, one part of dodecylbenzenesulfonic acid (DBSA) was added. After reacting 4 hours at 80° C., the system was cooled to 25° C. and maintained for 20 hours. The conversion of the silicone rubber material was 86.3%.

The pH of the system was restored to 7.0±0.5 with sodium hydroxide to give an emulsion of silicone-modified acrylic rubber particles (D1).

The solid content of the obtained emulsion was 21.5%, and the average particle size was 160 nm. The gel content (%) of that modified rubber was 92%.

(2) Preparation of graft copolymer (E) of silicone-modified acrylic rubber

A five-necked flask equipped with a stirrer, reflux condenser, nitrogen-introducing port, monomer-feeding port and thermometer was charged batchwise with components shown in Table 4. Then the mixture shown in Table 5 was added at 45° C. over two hours. After completion of the addition, the stirring was continued for 30 minutes to complete the polymerization.

TABLE 4

| Components | Amount (Parts) |
| --- | --- |
| Silicone-modified acrylic rubber particles (D1) (Solid) | 70 |
| SFS | 0.2 |
| Ferrous sulfate | 0.005 |
| EDTA | 0.01 |

TABLE 5

| Components | Amount (Parts) |
| --- | --- |
| Methyl methacrylate (MMA) | 30 |
| CHP | 0.1 |

The conversion of MMA was 99.2%, and the solid content of the emulsion was 28.3%. The average particle size of the graft copolymer particles was 180 nm.

Then two parts of calcium chloride was added to the emulsion for coagulation, followed by filtration and drying to give a graft copolymer powder of the silicone-modified acrylic rubber.

(3) Preparation of vinyl chloride resin composition

The blended composition shown in Table 6 was kneaded for five minutes with mixing rolls adjusted to 155° C. and then, compression-molded for 15 minutes at 180° C. under a pressure of 100 kg/cm² to give a test specimen.

As Comparative Example 1, a test specimen was made with the same composition and procedures as above by using a commercially available impact modifier of an acrylic rubber.

TABLE 6

| Components | Amount (Parts) |
| --- | --- |
| Vinyl chloride resin (average degree of polymerization: 700) | 100 |
| Graft copolymer | 10 |
| Dibutyltinmercaptide | 2 |
| Epoxylated soybean oil | 1 |
| Oil wax | 0.5 |

An Izod impact strength was measured at 23° C. and 0° C. by using the obtained test specimens. The same tests were made also with respect to the test specimens exposed for 300 hours in a sunshine weather-Ometer. The results are shown in Table 7.

TABLE 7

| | Izod impact strength (kg · cm/cm) | | | |
| --- | --- | --- | --- | --- |
| | Immediately after molding | | After 300 hours exposing | |
| | 23° C. | 0° C. | 23° C. | 0° C. |
| Ex. 1 | 140 | 30 | 96 | 18 |
| Com. Ex. 1 | 30 | 9 | 16 | 6 |

From the results of Table 7, it is seen that the graft copolymer prepared by using the silicone-modified acrylic rubber particles (D1) is excellent in impact resistance and weather resistance as compared with one prepared by using the acrylic rubber particles as a modifier for PVC.

EXAMPLES 2 TO 4 AND COMPARATIVE EXAMPLE 2

(1) Preparation of silicone-modified acrylic rubber particles (D1)

Silicone-modified acrylic rubber particles (D1) were prepared in the same manner as in Example 1 except that the amounts of the polymerizing monomers were changed to those shown in Table 8.

TABLE 8

|  | Ex. 2 | Ex. 3 | Ex. 4 | Com. Ex. 2 |
| --- | --- | --- | --- | --- |
| Components of acrylic rubber (A) (Parts) | | | | |
| BA | 60 | 30 | 60 | 60 |
| ALMA | 0.6 | 0.15 | 0.6 | 0.6 |
| TSMA | 0.3 | 0.3 | 0.3 | — |
| Silicone rubber precursor (B) (Parts) | | | | |
| D4 | 40 | 70 | 39 | 40 |
| TES | 0.8 | 0.7 | 0.8 | 0.8 |
| TVTMS* | — | — | 1 | — |
| Conversion (%) | | | | |
| (A) | 99.0 | 99.1 | 99.5 | 99.0 |
| (B) | 80.1 | 85.0 | 81.0 | 80.5 |
| (A) + (B) | 91.4 | 89.2 | 92.1 | 91.6 |
| Average particle size (nm) | 180 | 158 | 178 | 188 |

*Tetravinyltetremethylcyclotetrasiloxane (2) Preparation of graft copolymer (F) of silicone-modified acrylic rubber The components shown in Table 9 and including the emulsion of the silicone-modified acrylic rubber particles (D1) obtained in the above (1) were used, and a mixture shown in Table 10 was added at 45° C. over two hours. After the addition, stirring was continued for 30 minutes to complete the polymerization.

TABLE 9

| Components | Amount (Parts) |
| --- | --- |
| Silicone-modified acrylic rubber particles (D1) (Solid) | 70 |
| SFS | 0.2 |
| Ferrous sulfate | 0.005 |
| EDTA | 0.01 |

TABLE 10

| Components | Amount (Parts) |
| --- | --- |
| MMA | 30 |
| CHP | 0.1 |

An amount of two parts of calcium chloride was added to the obtained emulsion for coagulation, followed by filtration and drying to give a graft copolymer powder of silicone-modified acrylic rubber.

(3) Preparation of vinyl chloride resin composition

Test specimens were prepared with the same composition and the same procedures as in Example 1, and Izod impact strength was measured at 23° C. The results are shown in Table 11.

TABLE 11

|  | Ex. 2 | Ex. 3 | Ex. 4 | Com. Ex. 2 |
| --- | --- | --- | --- | --- |
| Izod impact strength (kg · cm/cm) | 112 | 121 | 108 | 38 |

From the results shown in Table 11, it is seen that the modifier for PVC resin which employs the silicone-modified acrylic rubber particles (D1) exhibits a high impact resistance even if an amount of the silicone rubber to be grafted to the acrylic rubber is changed, but in case where the acrylic rubber does not have active site to which the silicone rubber can be grafted, sufficient impact resistance is not exhibited.

EXAMPLE 5 AND COMPARATIVE EXAMPLE 3

Silicone-modified acrylic rubber particles (D1) were prepared in the same manner as in Example 1 except that an amount of initially charged SDBS was changed from 0.4 part to 0.2 part. The average size of the obtained rubber particles was 230 nm.

Graft copolymer particles shown in Table 12 were prepared by using the obtained rubber particles. Polymerization temperature was 60° C., and additional monomers were added over six hours, followed by heating up to 65° C. Then the polymerization was further continued for one hour to be completed.

As for Comparative Example 3, graft copolymerization was carried out in the same manner as above by using a polybutadiene rubber having an average particle size of 300 nm.

TABLE 12

|  | Ex. 5 | Com. Ex. 3 |
| --- | --- | --- |
| Initial charge (Parts) | | |
| Deionized water | 240 | 240 |
| Silicone-modified acrylic rubber particles (D1) (Solid) | 20 | — |
| Polybutadiene rubber (Solid) | — | 20 |
| Potassium persulfate (KPS) | 0.3 | 0.3 |
| Additional monomers (Parts) | | |
| Styrene (St) | 56 | 56 |
| Acrylonitrile (AN) | 24 | 24 |
| t-Dodecylmercaptan (tDM) | 0.4 | 0.4 |

The obtained emulsion was subjected to coagulation, followed by filtration and drying to give a powder.

An amount of 0.2 part of a phenolic stabilizer and 0.5 part of ethylenebisstearylamide were mixed to the obtained resin powder, and the mixture was melt-kneaded in an extruder to give pellets. Those pellets were injection-molded to give test specimens, and Izod impact strength was measured. Measurement of Izod impact strength was also made with respect to test specimens exposed in a sunshine weather-Ometer for 300 hours. The results are shown in Table 14.

EXAMPLE 6 AND COMPARATIVE EXAMPLE 4

A graft copolymer (F) shown in Table 13 was prepared by using the silicone-modified acrylic rubber particles (D1) of Example 5. Polymerization temperature was 60° C., and additional monomers were added over three hours. Then the polymerization was further continued for one hour to be completed.

As for Comparative Example 4, graft copolymerization was carried out in the same manner as above by using a polybutadiene rubber having an average particle size of 220 nm.

TABLE 13

|  | Ex. 6 | Com. Ex. 4 |
|---|---|---|
| Initial charge (Parts) | | |
| Deionized water | 240 | 240 |
| Silicone-modified acrylic rubber (Solid) | 70 | — |
| Polybutadiene rubber (Solid) | — | 70 |
| SFS | 0.4 | 0.4 |
| Ferrous sulfate | 0.005 | 0.005 |
| EDTA | 0.01 | 0.01 |
| Additional monomers (Parts) | | |
| Styrene (St) | 21 | 21 |
| Acrylonitrile (AN) | 9 | 9 |
| CHP | 0.4 | 0.4 |

The obtained emulsion was subjected to coagulation, followed by filtration and drying to give a powder after mixed to an emulsion of α-methylstyrene-acrylonitrile copolymer resin separately prepared through emulsion polymerization, so that the rubber content in the resin would be 18%.

An amount of 0.2 part of a phenolic stabilizer and 0.5 part of ethylenebisstearylamide were mixed to the obtained resin powder, and the mixture was melt-kneaded in an extruder to give pellets. Those pellets were injection-molded to give test specimens, and Izod impact strength was measured. Measurement of Izod impact strength was also made with respect to test specimens exposed in a sunshine weather-Ometer for 300 hours. The results are shown in Table 14.

TABLE 14

|  | Ex. 5 | Com. Ex. 3 | Ex. 6 | Com. Ex. 4 |
|---|---|---|---|---|
| Izod impact strength (kg · cm/cm) | | | | |
| Before exposed | 29 | 30 | 13 | 14 |
| After exposed | 23 | 18 | 9 | 6 |

From the results shown in Table 14, it is seen that if the polybutadiene portion of so-called an ABS resin and heat resistive ABS resin is replaced by the silicone-modified acrylic rubber particles (D1), the same impact resistance as in the case of polybutadiene and a higher weather resistance than the case of polybutadiene are exhibited.

EXAMPLE 7 AND COMPARATIVE EXAMPLE 5

(1) Preparation of silicone-modified acrylic rubber particles (D2)

A five-necked flask equipped with a stirrer, reflux condenser, nitrogen-introducing port, monomer-feeding port and thermometer was charged batchwise with components shown in Table 15.

TABLE 15

| Components | Amount (Parts) |
|---|---|
| Deionized water | 80 |
| Sodium dodecylbenzenesulfonate (SDBS) | 0.14 |
| Sodium formaldehydesulfoxylate (SFS) | 0.14 |
| Ferrous sulfate | 0.0016 |
| Disodium ethylenediaminetetraacetate (EDTA) | 0.0032 |

Subsequently, the inside of the system was replaced with nitrogen gas and heated up to 40° C. Then a mixture comprising the components shown in Table 16 was added over one hour. After completion of the addition, stirring was continued for one hour to complete the polymerization. A conversion was 99.2%. After the addition of the above-mentioned mixture, 0.07 part of SDBS was added. The average particle size of the acrylic rubber particles (A) in the obtained emulsion was 100 nm.

TABLE 16

| Components | Amount (Parts) |
|---|---|
| n-Butyl acrylate (BA) | 10 |
| Allyl methacrylate (ALMA) | 0.05 |
| γ-Methacryloyloxypropyltrimethoxysilane (TSMA) | 0.2 |
| Cumene hydroperoxide (CHP) | 0.02 |

Separately, as the silicone rubber precursor (B), a mixture solution comprising the components shown in Table 17 was stirred at 10,000 rpm for ten minutes with a homomixer to give an emulsion.

TABLE 17

| Components | Amount (Parts) |
|---|---|
| Deionized water | 36 |
| SDBS | 0.3 |
| Octamethylcyclotetrasiloxane (D4) | 20 |
| Tetraethoxysilane (TES) | 0.5 |

The above-mentioned emulsion of the silicone rubber precursor (B) was added batchwise to the emulsion containing the acrylic rubber particles (A). The inside temperature of the system was raised to 80° C. over about 30 minutes, and then 0.8 part of dodecylbenzenesulfonic acid (DBSA) was added. After reacting 4 hours at 80° C., the system was cooled to 25° C. and maintained for 20 hours. The conversion of the silicone rubber precursor (B) was 85.2%.

Subsequently, pH in the system was restored to 7.0±0.5 with sodium hydroxide to give an emulsion containing the silicone-modified acrylic rubber particles (D2). The solid content of the obtained emulsion was 19.2%, and the average particle size was 130 nm.

Then the components shown in Table 18 were added batchwise, and a mixture shown in Table 19 was added at 40° C. over five hours. After completion of the addition, stirring was continued for 30 minutes to complete the polymerization. The conversion of the acrylic rubber precursor (B) was 99.5%, and the solid content of the emulsion was 26.9%. The size of the obtained silicone-modified acrylic rubber particles (D2) contained in the emulsion was 190 nm. The gel content of the silicone-modified acrylic rubber particles (D2) was 92%.

TABLE 18

| Components | Amount (Parts) |
| --- | --- |
| Deionized Water | 150 |
| SFS | 0.16 |
| Ferrous sulfate | 0.001 |
| EDTA | 0.005 |

TABLE 19

| Components | Amount (Parts) |
| --- | --- |
| BA | 70 |
| ALMA | 0.35 |
| CHP | 0.16 |

(2) Preparation of graft copolymer particles (F) of silicone-modified acrylic rubber A five-necked flask equipped with a stirrer, reflux condenser, nitrogen-introducing port, monomer-feeding port and thermometer was charged batchwise with components shown in Table 20. Then the mixture comprising the components shown in Table 21 was added at 45° C. over two hours. The stirring was continued for 30 minutes after completion of the addition to complete the polymerization.

TABLE 20

| Components | Amount (Parts) |
| --- | --- |
| Silicone-modified acrylic rubber particles (D) prepared in the above (1) (Solid) | 70 |
| SFS | 0.2 |
| Ferrous sulfate | 0.001 |
| EDTA | 0.005 |

TABLE 21

| Components | Amount (Parts) |
| --- | --- |
| Methyl methacrylate (MMA) | 30 |
| CHP | 0.1 |

The conversion of MMA was 99.6%, and the solid content of an emulsion containing the obtained graft copolymer particles (F) was 34.4%. The average particle size of the graft copolymer particles (F) was 200 nm.

Then two parts of calcium chloride was added to the emulsion for coagulation, followed by filtration and drying to give a powder comprising the graft copolymer particles (F) of silicone-modified acrylic rubber.

(3) Preparation of polyvinyl chloride resin composition

The blended composition comprising the components shown in Table 22 was kneaded for five minutes with mixing rolls adjusted to 155° C. and then compression-molded for 15 minutes at 180° C. under a pressure of 100 kg/cm² to give a test specimen.

As Comparative Example 5, a test specimen was made with the same composition and procedures as above by using a commercially available impact modifier of an arcylic rubber.

TABLE 22

| Components | Amount (Parts) |
| --- | --- |
| Polyvinyl chloride resin (PVC) (average degree of polymerization: 700*) | 100 |
| Graft copolymer particles (F) | 10 |
| Dibutyltinmercaptide | 2 |
| Epoxylated soybean oil | 1 |
| Oil wax | 0.5 |

*Measured in accordance with JIS K 6721.

An Izod impact strength was measured in the same manner as mentioned above by using the obtained test specimens. The results are shown in Table 23.

TABLE 23

| | Izod impact strength (kg · cm/cm) | | | |
| --- | --- | --- | --- | --- |
| | Immediately after molding | | After 300 hours exposing | |
| | 23° C. | 0° C. | 23° C. | 0° C. |
| Ex.7 | 122 | 26 | 83 | 16 |
| Com. Ex.5 | 29 | 8 | 14 | 6 |

From the results of Table 23, it is seen that the graft copolymer particles (F) prepared by using the silicone-modified acrylic rubber particles (D2) are excellent in impact resistance and weather resistance as compared with the case where the acrylic rubber base impact modifier commercially available for PVC is used.

EXAMPLES 8 to 12 AND COMPARATIVE EXAMPLES 6 AND 7

(1) Preparation of silicone-modified acrylic rubber particles (D2)

Silicone-modified acrylic rubber particles (D2) were prepared in the same manner as in Example 7 except that the amounts of the polymerizing monomers were changed to those shown in Table 24.

TABLE 24

| | Ex. 8 | Ex. 9 | Ex. 10 | Ex. 11 | Ex. 12 | Com. Ex. 6 | Com. Ex. 7 |
| --- | --- | --- | --- | --- | --- | --- | --- |
| Amount of component (A) (Parts) | | | | | | | |
| BA | 5 | 15 | 25 | 15 | 15 | 15 | 70 |
| ALMA | 0.05 | 0.07 | 0.12 | 0.07 | 0.07 | 0.07 | 0.62 |
| TSMA | 0.02 | 0.15 | 0.25 | 0.15 | 0.15 | — | 0.15 |

TABLE 24-continued

|  | Ex. 8 | Ex. 9 | Ex. 10 | Ex. 11 | Ex. 12 | Com. Ex. 6 | Com. Ex. 7 |
|---|---|---|---|---|---|---|---|
| Amount of component (B) (Parts) | | | | | | | |
| D4 | 10 | 30 | 50 | 30 | 30 | 30 | 30 |
| TES | 0.2 | 0.6 | 1 | 0.6 | 0.6 | 0.6 | 0.6 |
| MPrDMS | — | — | — | 0.6 | — | — | — |
| DSMA | — | — | — | — | 0.6 | — | — |
| Amount of component (C) (Parts) | | | | | | | |
| BA | 85 | 55 | 25 | 55 | 55 | 55 | — |
| ALMA | 0.85 | 0.55 | 0.25 | 0.55 | 0.55 | 0.55 | — |
| Conversion (%) | | | | | | | |
| Component (A) | 99.2 | 99.3 | 99.1 | 99.2 | 98.9 | 99.1 | 99.1 |
| Component (B) | 85.0 | 84.9 | 85.1 | 86.0 | 85.6 | 85.4 | 60.0 |
| Component (C) | 99.0 | 99.0 | 98.9 | 99.1 | 99.0 | 99.0 | — |
| Components (A) + (B) + (C) | 97.6 | 94.8 | 92.0 | 95.1 | 94.9 | 94.9 | 87.3 |
| Average particle size (nm) | 198 | 201 | 201 | 205 | 203 | 200 | 199 |

In Table 24, MPrDMS stands for mercaptopropyldimethoxymethylsilane and DSMA stands for methacryloyloxypropyldimethoxymethylsilane.

As is clear from the results in Table 24, it is seen that the conversion of Comparative Example 7 is lower than that of Example 9 in which the component (B) comprises the same composition. This result shows that the conversion is lowered when the component (A)/component (B) ratio is increased.

(2) Preparation of graft copolymer particles (F) of silicone-modified acrylic rubber A five-necked flask equipped with a stirrer, reflux condenser, nitrogen-introducing port, monomer-feeding port and thermometer was charged with the components shown in Table 25, which include the emulsion containing the silicone-modified acrylic rubber particles (D2) obtained in the above (1), and the mixture comprising the components shown in Table 26 was then added at 45° C. over two hours. After completion of the addition, the stirring was continued for 30 minutes to complete the polymerization.

TABLE 25

| Components | Amount (Parts) |
|---|---|
| Silicone-modified acrylic rubber particles (D2) obtained in (1) (Solid) | 70 |
| SFS | 0.2 |
| Ferrous sulfate | 0.001 |
| EDTA | 0.005 |

TABLE 26

| Components | Amount (Parts) |
|---|---|
| MMA | 30 |
| CHP | 0.1 |

An amount of two parts of calcium chloride was added to the emulsion containing the obtained graft copolymer particles (F) for coagulation, followed by filtration and drying to give a powder comprising the graft copolymer particles (F) of silicone-modified acrylic rubber.

(3) Preparation of polyvinyl chloride resin composition

Test specimens were made with the same composition and the same procedures as in Example 7, and Izod impact strength (23° C.) was measured. The results are shown in Table 27.

TABLE 27

|  | Ex.8 | Ex.9 | Ex.10 | Ex.11 | Ex.12 | Com. Ex.6 | Com. Ex.7 |
|---|---|---|---|---|---|---|---|
| Izod impact strength (kg · cm/cm) | 101 | 125 | 130 | 127 | 132 | 60 | 95 |

As is clear from the results shown in Table 27, it is seen that in case where the graft copolymer particles (F) of silicone-modified acrylic rubber of the present invention is used as an impact modifier (Examples 8 to 12), a high impact resistance is exhibited even if the ratio of the acrylic rubber particles (A) to the silicone rubber precursor (B) is changed, while in case where the acrylic rubber particles contain no active site where the silicone rubber precursor can be graftpolymerized (Comparative Example 6), sufficient impact resistance is not exhibited. Also it is seen that the test specimen prepared with the component (A)/component (B) ratio being increased (Comparative Example 7) is inferior in impact resistance.

EXAMPLE 13 AND COMPARATIVE EXAMPLE 8

Silicone-modified acrylic rubber particles (D2) were prepared in the same manner as in preparation (1) of the silicone-modified acrylic rubber particles (D2) of Example 7 except that an amount of initially charged SDBS was changed from 0.14 part to 0.07 part. The average size of the obtained particles (D2) was 280 nm.

Graft copolymer particles (F) were prepared as for Example 13 by using the obtained silicone-modified acrylic rubber particles (D2) and the components shown in Table 28. Polymerization temperature was 60° C., and additional monomers shown in Table 28 were added over six hours, followed by heating up to 65° C. Then the stirring was further continued for one hour to complete polymerization.

As for Comparative Example 8, graft copolymer particles were prepared in the same manner as in Example 13 except that a polybutadiene rubber having an average particle size of 300 nm was used instead of the silicone-modified acrylic rubber particles (D2).

TABLE 28

|  | Ex.13 | Com.Ex.8 |
|---|---|---|
| Initial charge (Parts) | | |
| Deionized water | 240 | 240 |
| Silicone-modified acrylic rubber particles (D2) (Solid) | 20 | — |
| Polybutadiene rubber (Solid) | — | 20 |
| Potassium persulfate (KPS) | 0.3 | 0.3 |
| Additional monomers (Parts) | | |
| Styrene (St) | 56 | 56 |
| Acrylonitrile (AN) | 24 | 24 |
| t-Dodecylmercaptan (tDM) | 0.4 | 0.4 |

The obtained emulsion was subjected to coagulation, followed by filtration and drying to give a powder.

An amount of 0.2 part of a phenolic stabilizer and 0.5 part of ethylenebisstearylamide were mixed to the obtained powder comprising a thermoplastic resin composition, and the mixture was melt-kneaded in an extruder to give pellets. Those pellets were injection-molded to give test specimens, and Izod impact strength was measured in the manner mentioned above. The results are shown in Table 30.

EXAMPLE 14 AND COMPARATIVE EXAMPLE 9

Graft copolymer particles (F) were prepared as for Example 14 by using the silicone-modified acrylic rubber particles (D2) of Example 13 and the components shown in Table 29. Polymerization temperature was 60° C., and additional monomers were added over three hours. Then the stirring was further continued for one hour to complete polymerization.

As for Comparative Example 9, graft copolymer particles (F) were prepared in the same manner as in Example 14 except that a polybutadiene rubber having an average particle size of 220 nm was used instead of the silicone-modified acrylic rubber particles (D2).

TABLE 29

| Components | Ex.14 | Com.Ex.9 |
|---|---|---|
| Initial charge (Parts) | | |
| Deionized water | 240 | 240 |
| Silicone-modified acrylic rubber particles (D2) (Solid) | 70 | — |
| Polybutadiene rubber (Solid) | — | 70 |
| SFS | 0.4 | 0.4 |
| Ferrous sulfate | 0.005 | 0.005 |
| EDTA | 0.01 | 0.01 |
| Additional monomers (Parts) | | |
| Styrene (St) | 21 | 21 |
| Acrylonitrile (AN) | 9 | 9 |
| t-Dodecylmercaptan (tDM) | 0.4 | 0.4 |
| Cumene hydroperoxide (CHP) | 0.1 | 0.1 |

The obtained emulsion containing particles was mixed to an emulsion of α-methylstyrene-acrylonitrile copolymer resin separately prepared through emulsion polymerization, so that the rubber content in the thermoplastic resin composition would be 18%, and was then subjected to coagulation, followed by filtration and drying to give a powder.

An amount of 0.2 part of a phenolic stabilizer and 0.5 part of ethylenebisstearylamide were mixed to the obtained powder comprising a thermoplastic resin composition, and the mixture was melt-kneaded in an extruder to give pellets. Those pellets were injection-molded to give test specimens, and Izod impact strength was measured in the manner mentioned above. The results are shown in Table 30.

TABLE 30

|  | Ex.13 | Com. Ex.8 | Ex.14 | Com. Ex.9 |
|---|---|---|---|---|
| Izod impact strength (kg · cm/cm) | | | | |
| Before exposed | 30 | 31 | 13 | 14 |
| After exposed | 25 | 18 | 9 | 7 |

From the results shown in Table 30, it is seen that if the polybutadiene portion of so-called an ABS resin and heat resistive ABS resin is replaced by the silicone-modified acrylic rubber particles (D2), the same impact resistance as in the case of polybutadiene and a higher weather resistance than the case of polybutadiene are exhibited.

EXAMPLE 15

A five-necked flask equipped with a stirrer, reflux condenser, nitrogen-introducing port, monomer-feeding port and thermometer was charged with the components shown in Table 31, which include the emulsion containing the silicone-modified acrylic rubber particles (D2) obtained in Example 12, and the mixture comprising the components shown in Table 32 was then added at 45° C. over two hours. After completion of the addition, the stirring was continued for 30 minutes to complete the polymerization, and thus graft copolymer particles (F) of silicone-modified acrylic rubber was prepared.

TABLE 31

| Components | Amount (Parts) |
|---|---|
| Silicone-modified acrylic rubber particles (D2) obtained in Example 12 (Solid) | 80 |
| SFS | 0.2 |
| Ferrous sulfate | 0.001 |
| EDTA | 0.005 |

TABLE 32

| Components | Amount (Parts) |
|---|---|
| MMA | 20 |
| CHP | 0.1 |

An amount of two parts of calcium chloride was added to the emulsion containing the obtained graft copolymer particles (F) for coagulating, followed by filtration and drying to give a powder comprising the graft copolymer particles (F) of silicone-modified acrylic rubber.

Then a test specimen was made in the same manner as in Example 7 except that the amount of the graft copolymer particles (F) was changed (to 20 parts). Measurement of Izod impact strength (23° C.) indicates high impact strength without breakage of the test specimen.

EXAMPLES 16 TO 18 AND COMPARATIVE EXAMPLES 10 to 12

As for Examples 16 to 18, graft copolymer particles (F) were prepared by using the components shown in Table 33 which include the silicone-modified acrylic rubber particles (D2) obtained in Example 7. The polymerization temperature was 60° C., and additional monomers were added over three hours, followed by stirring for one hour to complete the polymerization.

TABLE 33

| Components | Ex.16 | Ex.17 | Ex.18 |
|---|---|---|---|
| Initial charge (Part) | | | |
| Deionized water | 240 | 240 | 240 |
| Silicone-modified acrylic rubber particles (D2) of Example 7 (Solid) | 60 | 60 | 20 |
| SFS | 0.4 | 0.4 | 0.4 |
| Ferrous sulfate | 0.005 | 0.005 | 0.005 |
| EDTA | 0.01 | 0.01 | 0.01 |
| Additional monomers (Parts) | | | |
| St | 27 | 28 | 60 |
| AN | 11 | 12 | 20 |
| Methacrylic acid | 2 | — | — |
| t-Dodecylmercaptan (tDM) | 0.4 | 0.4 | 0.8 |
| CHP | 0.1 | 0.1 | 0.1 |

The obtained graft copolymer particles (F) were mixed in an amount shown in Table 34 based on 100 part of the thermoplastic resin shown in the same table, and thermoplastic resin composition, and then test specimens were made with an injection molding machine. Izod impact strength (23° C.) was measured. Only in Example 18, a ⅛ bar used for the measurement. The same measurement was made as for comparative Example 10 to 12 wherein the graft copolymer particles (F) were not mix.

TABLE 34

| | Ex.16 | Com. Ex.10 | Ex.17 | Com. Ex.11 | Ex.18 | Com. Ex.12 |
|---|---|---|---|---|---|---|
| Thermoplastic resin | PA | | PBT | | PC | |
| Amount of graft copolymer particles (F) (Parts) | 30 | 0 | 30 | 0 | 100 | 0 |
| Izod impact strength | 14 | 2 | 13 | 2 | 47 | 13 |

PA: Polyamide resin
PBT: Polybutylene terephthalate resin
PC: Polycarbonate resin From Table 34, it is seen that the graft copolymer of the present invention has an effect of improving impact resistance of each engineering resin.

INDUSTRIAL APPLICABILITY

As it is clear from the above-mentioned results, the graft copolymer particles (F) of silicone-modified acrylic rubber of the present invention can be prepared from the silicone-modified acrylic rubber particles (D) obtained by graft-polymerizing the silicone rubber precursor (B) to the acrylic rubber particles (A), at a high conversion by using a conventional emulsion polymerization apparatus and technique, and are useful as an impact modifier for a thermoplastic resin. The thermoplastic resin composition comprising the mixture of the above-mentioned graft copolymer particles (F) and the thermoplastic resin can give moldings being excellent in impact resistance and weather resistance.

We claim:

1. Silicone-modified acrylic rubber particles prepared by graft-polymerizing;
   (B) 45 to 5,000 parts by weight of a silicone rubber precursor comprising (B-1) 99.9 to 80% by weight of a low molecular weight organosiloxane, (B-2) 0.1 to 10% by weight of a polyfunctional silane compound and (B-3) 0 to 10% by weight of a reactive silane compound having a polymerizable unsaturated bond or a mercapto group in its molecule (the sum of (B-1) to (B-3) being 100% by weight) to
   (A) 100 parts by weight of acrylic rubber particles obtained by copolymerizing (A-1) 99.9 to 65% by weight of at least one monomer selected from the group consisting of an alkyl acrylate having an alkyl group of 1 to 12 carbon atoms and an alkyl methacrylate having an alkyl group of 4 to 12 carbon atoms, (A-2) 0 to 5% by weight of a polyfunctional monomer having two or more of polymerizable unsaturated bonds in its molecule, (A-3) 0.1 to 10% by weight of a monomer having a polymerizable unsaturated bond and a reactive silyl group in its molecule and (A-4) 0 to 20% by weight of a monomer having an unsaturated bond copolymerizable with monomers (A-1) to (A-3) (the sum of (A-1) to (A-4) being 100% by weight)
(provided that the monomer (A-2) and (B-3) being not zero at the same time).

2. The silicone-modified acrylic rubber particles of claim 1, wherein an amount of said silicone rubber precursor (B) is from 100 to 500 parts by weight.

3. Graft copolymer particles of silicone-modified acrylic rubber, which are prepared by graft-polymerizing a vinyl monomer to the silicone-modified acrylic rubber particles of claim 1.

4. The graft copolymer particles of silicone-modified acrylic rubber of claim 3, which are prepared by graft-polymerizing 90 to 10% by weight of said vinyl monomer to 10 to 90% by weight of said silicone-modified acrylic rubber particles (the sum of the both being 100% by weight).

5. The graft copolymer particles of silicone-modified acrylic rubber of claim 4, wherein an amount of said silicone-modified acrylic rubber particles is from 15 to 85% by weight and an amount of said vinyl monomer is from 85 to 15% by weight.

6. The graft copolymer particles of silicone-modified acrylic rubber of claim 3, wherein said vinyl monomer is at least one monomer selected from the group consisting of an aromatic vinyl monomer, a vinyl cyanide monomer, an acrylic monomer and a methacrylic monomer.

7. A thermoplastic resin composition comprising 2 to 60 parts by weight of the graft copolymer particles of silicone-modified acrylic rubber of claim 3 and 100 parts by weight of a thermoplastic resin.

8. The thermoplastic resin composition of claim 7, wherein said thermoplastic resin is at least one resin selected from the group consisting of poly(vinyl chloride) resin, polystyrene resin, styrene-acrylonitrile copolymer resin, styrene-acrylonitrile-N-phenylmaleimide copolymer resin, α-methylstyrene-acrylonitrile copolymer resin, poly(methyl methacrylate) resin, methyl methacrylate-styrene copolymer resin, polycarbonate resin, polyamide resin, polyester resin and polyphenylene ether-polystyrene composite resin.

9. Silicone-modified acrylic rubber particles prepared by graft-polymerizing;

(B) 45 to 5,000 parts by weight of a silicone rubber precursor comprising (B-1) 99.9 to 80% by weight of a low molecular weight organosiloxane, (B-2) 0.1 to 10% by weight of a polyfunctional silane compound and (B-3) 0 to 10% by weight of a reactive silane compound having a polymerizable unsaturated bond or a mercapto group in its molecule (the sum of (B-1) to (B-3) being 100% by weight) to (A) 100 parts by weight of acrylic rubber particles obtained by copolymerizing (A-1) 99.9 to 65% by weight of at least one monomer selected from the group consisting of an alkyl acrylate having an alkyl group of 1 to 12 carbon atoms and an alkyl methacrylate having an alkyl group of 4 to 12 carbon atoms, (A-2) 0 to 5% by weight of a polyfunctional monomer having two or more of polymerizable unsaturated bonds in its molecule, (A-3) 0.1 to 10% by weight of a monomer having a polymerizable unsaturated bond and a reactive silyl group in its molecule and (A-4) 0 to 20% by weight of a monomer having an unsaturated bond copolymerizable with monomers (A-1) to (A-3) (the sum of (A-1) to (A-4) being 100% by weight) (provided that the monomer (A-2) and (B-3) being not zero at the same time), and thereto graft-polymerizing (C) 0.1 to 5,000 parts by weight of an acrylic rubber precursor comprising (C-1) 99.9 to 75% by weight of at least one monomer selected from the group consisting of an alkyl acrylate having an alkyl group of 1 to 12 carbon atoms and an alkyl methacrylate having an alkyl group of 4 to 12 carbon atoms, (C-2) 0.1 to 5% by weight of a polyfunctional monomer having two or more of polymerizable unsaturated bonds in its molecule and (C-3) 0 to 20% by weight of a monomer having an unsaturated bond copolymerizable with the monomers (C-1) and (C-2) (the sum of monomers (C-1) to (C-3) being 100% by weight).

10. The silicone-modified acrylic rubber particles of claim 9, wherein an amount of said silicone rubber precursor (B) is from 100 to 500 parts by weight.

11. The silicone-modified acrylic rubber particles of claim 9, wherein an amount of said acrylic rubber precursor (C) is from 100 to 5,000 parts by weight.

12. Graft copolymer particles of silicone-modified acrylic rubber, which are prepared by graft-polymerizing a vinyl monomer to the silicone-modified arylic rubber particles of claim 9.

13. The graft copolymer particles of silicone-modified acrylic rubber of claim 12, which are prepared by graft-polymerizing 90 to 10% by weight of said vinyl monomer to 10 to 90% by weight of said silicone-modified acrylic rubber particles (the sum of the both being 100% by weight).

14. The graft copolymer particles of silicone-modified acrylic rubber of claim 13, wherein an amount of said silicone-modified acrylic rubber particles is from 15 to 85% by weight and an amount of said vinyl monomer is from 85 to 15% by weight.

15. The graft copolymer particles of silicone-modified acrylic rubber of claim 12, wherein said vinyl monomer is at least one monomer selected from the group consisting of an aromatic vinyl monomer, a vinyl cyanide monomer, an acrylic monomer and a methacrylic monomer.

16. A thermoplastic resin composition comprising 2 to 60 parts by weight of the graft copolymer particles of silicone-modified acrylic rubber of claim 12 and 100 parts by weight of a thermoplastic resin.

17. The thermoplastic resin composition of claim 16, wherein said thermoplastic resin is at least one resin selected from the group consisting of poly(vinyl chloride) resin, polystyrene resin, styrene-acrylonitrile copolymer resin, styrene-acrylonitrile-N-phenylmaleimide copolymer resin, α-methylstyrene-acrylonitrile copolymer resin, poly(methyl methacrylate) resin, methyl methacrylate-styrene copolymer resin, polycarbonate resin, polyamide resin, polyester resin and polyphenylene ether-polystyrene composite resin.

* * * * *